B. DARROW.
EXPANSIBLE CORE AND MOLD THEREFOR.
APPLICATION FILED OCT. 28, 1916.
1,375,214.
Patented Apr. 19, 1921.
2 SHEETS—SHEET 2.
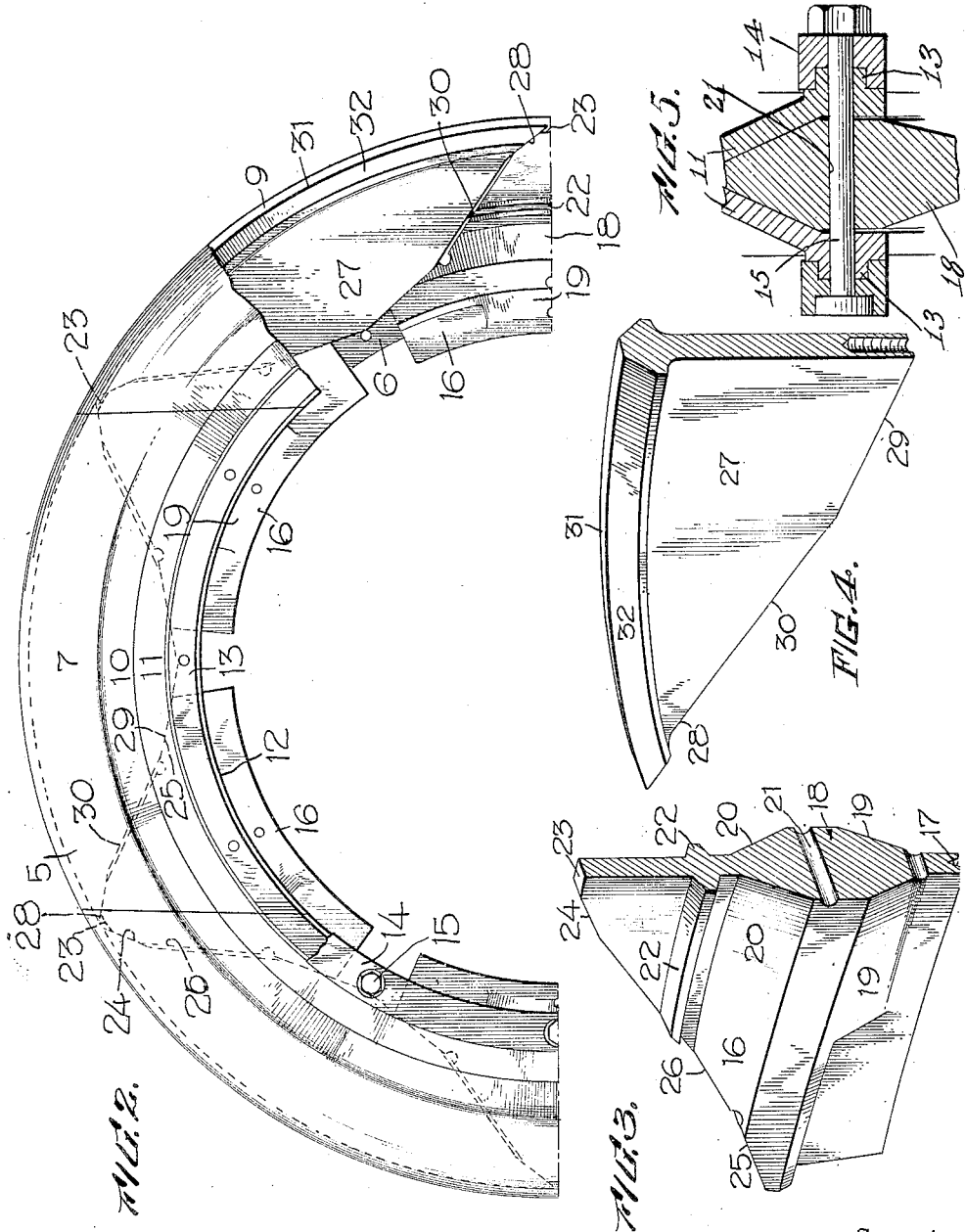
Inventor
Burgess Darrow.
Witness
R. F. Trogner.
By C. L. Landon
Attorney

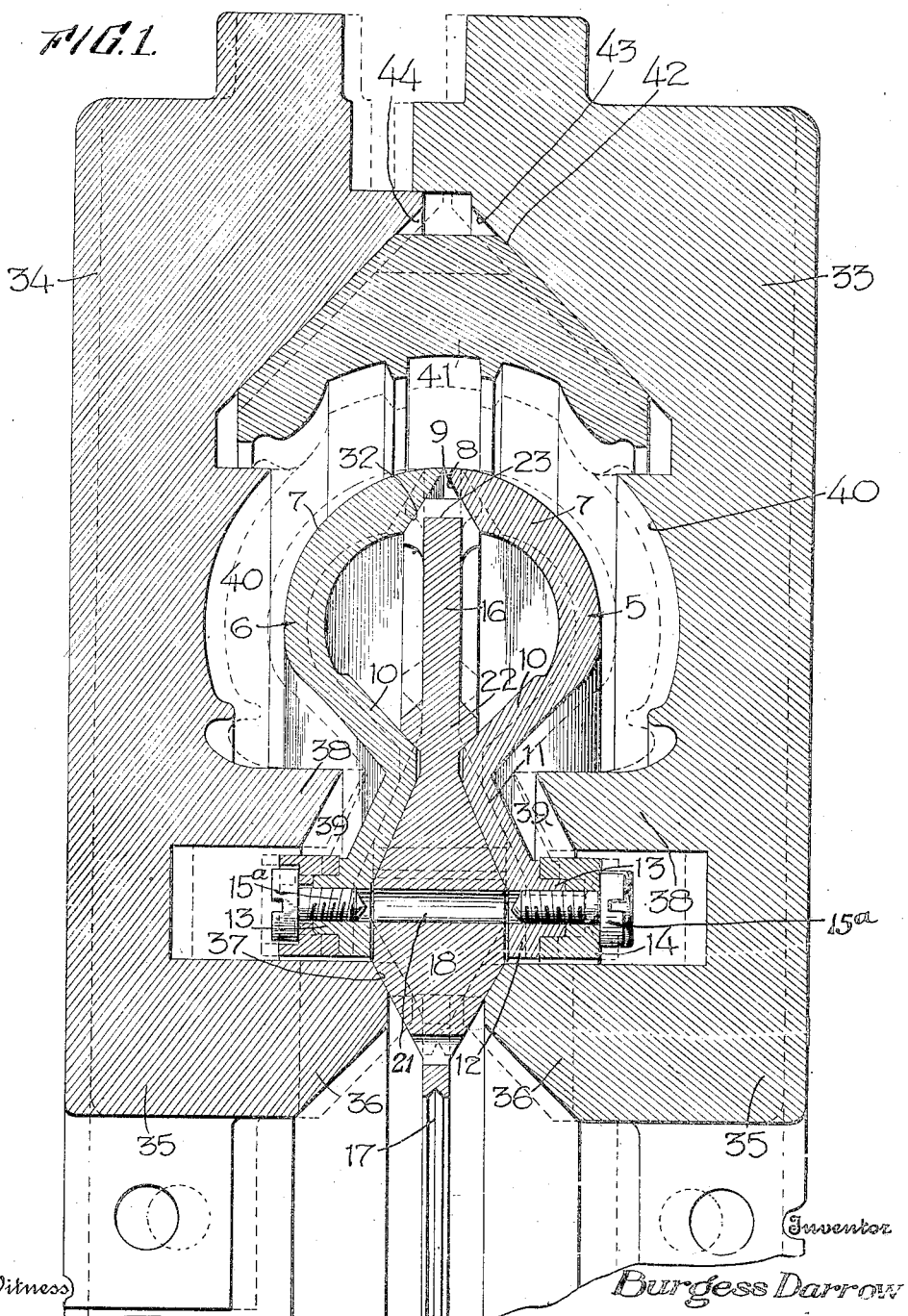

UNITED STATES PATENT OFFICE.

BURGESS DARROW, OF AKRON, OHIO, ASSIGNOR TO THE GOODYEAR TIRE & RUBBER COMPANY, OF AKRON, OHIO, A CORPORATION OF OHIO.

EXPANSIBLE CORE AND MOLD THEREFOR.

1,375,214.  Specification of Letters Patent.  Patented Apr. 19, 1921.

Application filed October 28, 1916. Serial No. 128,226.

*To all whom it may concern:*

Be it known that I, BURGESS DARROW, a citizen of the United States, residing at Akron, in the county of Summit and State of Ohio, have invented new and useful Improvements in Expansible Cores and Molds Therefor, of which the following is a specification.

My present invention relates to improvements in the apparatus used in vulcanizing pneumatic tire casings, and more specifically comprehends a combination of a ring core or former and a mold therefor, the core being automatically expansible to stretch the tire carcass when pressure is applied to the novel mold, into which the core with its carcass is adapted to be inserted for vulcanization of the tire casing.

Pneumatic tires are built up by hand, by machine, or by a combination of both, upon a core which serves to give the green carcass its initial shape. When the carcass is to be vulcanized, some means must be provided to insure a definite stretch or expansion of the carcass, while within its vulcanizing mold, in order to obtain that final placement of the fabric elements composing the carcass which experience has shown to be most desirable.

A number of systems for expanding the carcass during the process of vulcanization have been devised, among which may be mentioned the two best known practices; first, that of using an air-bag with which the tire may be internally fitted, the bag being blown up to impart the desired stretch; and, secondly, the method of hydraulic vulcanization which employs hydraulic pressure to the same end as the pneumatic pressure of the air-bag system.

Both of these systems are open to objection on various counts which need not be here recited in detail, it being sufficient to point out the primary objection that each of these well known practices involves the removal of the tire from the ring core upon which it has been initially laid up.

The means proposed herein, however, provide for the automatic expansion of the tire carcass within its mold by the pressure of the mold parts upon the building-core itself, the latter being constructed of halves which may be separated by a series of internal wedges, which are automatically yieldable to the pressure of the mold parts to provide the degree of expansion desired for the tire carcass.

One of the principal objects of my invention, accordingly, has been to provide a core, or former, composed of separate portions adapted to mate circumferentially and having interposed therebetween a number of wedge members which are adapted, when the inclosing mold parts exert a simultaneous pressure radially outward upon all of said wedges, to separate the core halves a sufficient distance to impart the desired stretch to the tire carcass.

It is an object of equal importance with the foregoing to provide a mold with which my expansible core is best adapted for use, such mold having wedge surfaces adapted to contact with the various wedge parts of the core contained within the mold, and being also equipped with movable treading band portions which are adapted to be forced against the expanded tire carcass in an annular group.

A further object of the invention, and one more specifically related to the novel core structure, resides in the provision of wedging means and filler pieces for the interior of the two-part core, the wedge means being adapted to expand the core by moving the parts thereof along divergent paths, and the filler parts being adapted to close such openings as may appear in the expanded core outlined by a divergence of the main portions, in order that a continuous solid surface be provided for the core in its expanded position.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 is a cross-sectional view taken through one of my novel molds, in which is mounted a core in readiness to be expanded;

Fig. 2 is a partial side elevational view of the core of my invention, parts being broken away to illustrate the interior fitting of the adjuncts thereof;

Fig. 3 is a perspective view of a section taken through one of the expanding core wedges;

Fig. 4 is a similar view of one of the filler parts of the core; and

Fig. 5 is a detail section.

The automatic carcass expanding means comprehended by this invention being composite in its nature, as inclusive of both a special core and a special mold to coact therewith, that portion of the invention relating to the novel core will first be described.

As has been indicated, the core consists of a pair of circular portions which are adapted to be circumferentially mated to produce a core upon which the carcass may be built, and which are adapted to be later circumferentially disassociated to acquire the expanding movement which is to be imparted to the carcass during the cure. The main core parts are designated by numerals 5 and 6, and are preferably composed of a plurality of segments so connected as to form a substantial annulus having a circumferential bulge or crown portion 7 which is adapted to impart the cross-sectional shape to the tire casing. This preferred structure of core permits its ready insertion into and extraction from the tire carcass, in case a wire bead is used in the carcass. The bulge 7 of each core part terminates at the outer circumference of the part in the bevel 8, which provides the sharp annular tongue 9, the tongues 9 of the mating core parts meeting along a central circumferential line of contact, when the core is assembled for the building processes of the tire. Inwardly, the center bulge 7 terminates in a slant wall 10, which is adapted to shape the toes of the tire, and which is integrally extended by the outwardly slanted base wall 11 at the extremity of which is formed an integral base annulus 12. Each of the base annuli of the core portions is formed with a rib 13 which is adapted to engage with an interiorly channeled core ring 14. Bolt holes are channeled in alinement through opposite base annuli and core rings for the accommodation of the bolts 15 whereby the core parts are to be securely held together to provide a complete former upon which the green tire carcass may be readily laid up.

Interposed between the two core parts 5 and 6 are a plurality of expanding wedges 16, here illustrated as being six in number although this number may be increased or diminished if such action is warranted. Each of the wedges is of the roughly triangular shape in elevation shown in Figs. 2 and 3 and is channeled along its inner circumference, as denoted by the numeral 17, to provide means whereby the core may be seated upon the extensible arms of such tire-mounting chucks as are now in common use. Immediately above its mounting base, the expanding wedge 16 is formed with a circumferential enlargement 18 which tapers off toward its inner circumference along the slant faces 19 and toward the outer circumferences along the slant faces 20. It is upon the slant faces 19 that the mold parts are adapted to exert the core expanding pressures and it is by means of the beveled engagement existing between the slant faces 20 and the base walls 11 of the core parts (see Fig. 1) that the latter are to be separated when arranged within the mold. Bolt channels 21 are provided through the wedge enlargements 18 in alinement with the bolt channels of the core bases 13 and rings 14, in order that the bolts 15, see Fig. 5, may hold the expanding wedges as immovable parts of the core structure, during the building process of the tire. The bolts are removed, of course, prior to the closing of the mold parts about the core, short fastenings 15ᵃ being substituted on each side to hold the rings 14 upon the core bases, as shown in Fig. 1.

Immediately above the slant faces 20, which terminate the wedge enlargements 18, is arranged a pair of integral ribs 22 which are adapted to rest upon the inner surfaces of the converging walls 10 of the core parts, in support of the wedges 16, when the bolts 15 have been withdrawn for insertion of the core into the mold. As has been stated, each wedge is, roughly, of a triangular shape, terminating in the flattened apex 23 which lies in an assembled core, between the beveled tongues 9 of the opposite core parts. The flattened apex 23 is arranged along the radial center of each core wedge and, from this point, the edges of the wedge diverge toward the base thereof along slants denoted by the numerals 24. Parallel slant edges 25 are provided at each extremity of the wedge base, and respective slant edges 24 and 25 are connected by edges 26 of a steeper pitch.

The apex edge slants 24 and the base edge slants 25 provide the wedge faces whereby each of the wedges 16 acts upon a pair of the fillers 27, whose edges 28, 29 and 30 correspond to the compound slant edges 24, 25 and 26 just described.

By connecting the apex and base slant edges 24 and 25 of each wedge by the steeper edge 26, and by similarly connecting the apex and base slant edges 28 and 29 of the filler pieces 27 by means of the steeper edge 30, it is not necessary to make the individual wedges 16 of such width as would be required by a single continuous edge having the common slant of the edges 24 and 25. The connecting edges 26 or 30 are not active wedging agents, as all of the radial expansion exerted upon the filler piece 27 by outward movement of the wedges 16 is borne by the top and base edges of the respective fillers and wedges.

The filler portions 27 are each provided with a circumferential edge 31 which is an arc substantially corresponding to the curvature of the outer core circumference, that is, the curvature of the median line along which the core tongues 9 are mated. Flaring out from this circumferential edge 31 are the slant faces 32 which are adapted to mate with the beveled termini 8 carried by the bulges 7 of the opposite core parts. It is these slant edges 32 which are the final instruments in separating the divergent core parts 5 and 6, the filler pieces 27 being moved radially outward to accomplish this effect at the same time that the wedge faces 20 are exerting a similar action upon the base walls 11 of the separate core parts.

The mold with which the core of my invention is best adapted for use is illustrated in Fig. 1 as inclusive of the usual oppositely mating parts 33 and 34. The inner circumference of each mold part is formed by an annular ledge or wall 35, which is provided with a beveled terminus 36 engaging the wedge faces 19 along the slant edge 37. It is by means of the pressure exerted upon the various wedges of the core by means of the approach of the mold parts 33 and 34 in the vulcanizing presses that the radial outward movement of the wedges is secured to separate the core parts 5 and 6. Annular ledges or ribs 38 are concentric with the walls 35 but spaced outwardly therefrom a sufficient distance to accommodate the core bases therebetween. Each of the ribs 38 is provided with a beveled edge 39 which is adapted to approach and engage with the base walls 11 of each core part, forming supports for the toes of the tire being vulcanized.

Each of the mold portions 33 and 34 is formed with its tire receiving cavity, these cavities being designated by the numeral 40. The shaping effect of these cavities upon the green carcass during the process of vulcanization is supplemented by the action of the segmental tread wedges 41, which may be grouped to form a complete annulus, upon the inner circumference of which are provided ribs and cavities or other intaglio device which will result in the desired tread design. The segments 41 are each provided with equally and oppositely beveled edges 42 which engage with the slant faced cavities 43 and 44 formed in the respective mold parts. Closure of the mold in such fashion that the core is laterally and circumferentially expanded results in the clamping of the grouped tread segments 41 upon the tire tread in such a manner that they form a complete tread producing annulus therefor.

From the foregoing detailed description it will now be apparent that the apparatus contemplated by my method of mechanically expanding tire carcasses, within their vulcanizing molds and upon the formers on which they have been originally laid up, includes a two-part core and a two-part mold, the former being both laterally and circumferentially expansible by the action of a plurality of wedges which are simultaneously operated by pressure of the mold parts.

As the core portions 5 and 6 diverge the arcuate filler edges 31 are forced outwardly between the separated tongues 9 until they are flush therewith to form a continuous surface against the inside of the tire to be cured. Although the sum total of the arcuate lengths of the filler edge 31 cannot equal the circumferential length of the core parts as measured along the tongues 9 (if these filler parts are to be accommodated within the core when the latter is in its unexpanded state) this difference in circumferential length is made up by the outward movement of the flattened apexes 23 of the various wedges until they are flush with the outer surface of the core tongues 9 and with the edges of the pair of adjacent fillers 27 which they separate. Thus, the core parts 5 and 6 are entirely separated by a circumferential band, composed of the filler edges and wedge apexes 23, which completes an even surface acting against the interior of the tire.

While the invention herein disclosed is unitary and capable of practical employment without further apparatus, I desire to point out that an advantageous method of manufacturing tires may be evolved by a combination, with this present invention, of the devices set forth in my Patent No. 1,212,457, January 16, 1917 and co-pending application, Serial No. 112,029. The patent provides a method whereby pneumatic tire casings may be laid up upon a ring core or former which has been given a false shape by means of flexible pads in such a manner that when the pads are removed, and the core with its incumbent tire placed in the vulcanizing mold, the carcass is given a stretch by merely being made to conform to the true shape of the core. In the application Ser. No. 112,029 I have set forth the use of a fabric strip which is to be incorporated into the tire along inner edges of the toe flanges thereof, such strip to be held fast by the mold parts in order that the toes of the tire may be accurately defined within the mold.

By the use of pads upon the core of my present invention I shall be enabled to gain an even greater percentage of stretch than is possible by the employment alone of the wedge means herein recited, and by use of the toe flap which may be engaged between the respective core walls 11 and mold ledges 38 I shall be able to produce a tire having the most clearly defined toe flanges. I also desire to point out that the segmental treading molds may be dispensed with in the present apparatus, and also that this tread-molding group may be desirably employed to advantage in connection with vulcanizing molds which are otherwise unequipped with the specific provisions of this invention.

What I claim is:

1. A vulcanizing apparatus including mating mold members, annular mating core members, and wedge means to separate said core members, without changing the diameter of the annulus, said wedge means being operable by movement of one of said mold members laterally of said means.

2. In a vulcanizing apparatus, the combination of mating mold members, annular mating core members receivable between said mold members, mating tread forming members engaged by said mold members, and wedge means for separating said core members without change in diameter of the annulus, as said mold members are moved to mating position.

3. In a vulcanizing apparatus, mating mold members; mating core members; and mating tread forming members, said tread forming members being receivable between said mold members and being capable of being mated simultaneously with the movement of said mold members into mating position.

4. In a vulcanizing apparatus, mating mold members; mating core members; and mating tread forming members, said tread forming members and said core members being receivable between said mold members in such a manner that movement of the mold members into mating position acts to simultaneously move the tread forming members into mating position and the core members out of mating position.

5. In a vulcanizing apparatus, mating mold members, mating core members and mating tread forming members; and means for accommodating said tread forming members and said core members between said mold members in such a manner that a mating of the mold members causes an expansion of the core members from their mated position and a mating of the tread-forming members about the separated core members.

6. A vulcanizing apparatus, including core members; circumferentially mated members interposed between said core members and provided with wedging extremities and a mold composed of mating mold parts each of which is adapted to act upon the extremities of said wedge members to force a separation between the core members as the mold parts are closed thereabout.

7. A vulcanizing apparatus, including core members arranged to be circumferentially mated or separated; wedge members interposed between said core members and provided with beveled extremities; a mold composed of mating mold parts, each of said mold parts having a slant face in engagement with the beveled extremities of said wedge members whereby movement of the mold parts to their closed position causes a radial projection of said wedge members outwardly between said core members, with a resultant expansion of the latter.

8. A vulcanizing apparatus including core members adapted to be circumferentially mated or separated; wedge members interposed between said core members, each of said wedge members being provided with a beveled extremity; filler members also interposed between said core members and in contact with said wedge members; and a mold including mold parts, each of the mold parts being formed with a slant edge in contact with the beveled extremities of said wedge members, whereby closure of the mold by approach of the mold parts results in a radial projection of all wedge members and filler members simultaneously to expand the core by separating the core members and by filling the apertures of separation.

9. An expansible core including a pair of circumferentially mating members; radially projecting wedge members interposed between the mating core members at spaced intervals in order to separate the core members when the wedge members are radially projected; and filler members adapted to fill the space between separate core members upon action of said core members.

10. An expansible core including circular core members adapted to be circumferentially mated to form a complete core; wedge members interposed between the mated core members for separation thereof by radial thrusts; and filler members engageable by said wedge members for movement outwardly to fill the circumferential space of separation between the core members.

11. An expansible core including circular members circumferentially mated to form a complete core; wedge members interposed between the core members for separation thereof when radially projected; and filler members adapted to partially bridge the gap between the separate core members, the remainder of the gap between the separated core members being filled by said wedge members.

12. An expansible core including circular members adapted to be circumferentially mated or separated; wedge members interposed between said circular members and adapted to separate the latter by direct radial thrusts; means passing through said wedge members for connecting said core members to prevent expansion of the core members; and means to support the wedge members between the core members upon withdrawal of said connecting means.

13. In a vulcanizing apparatus, mating mold members; mating core members; and mating tread forming members, said tread forming members and said core members being receivable between said mold members and being capable of being simultaneously moved to the final position to be occupied by them during the vulcanization processes by movement of said mold members into mating position.

14. A vulcanizing mold comprising recessed sections constructed to be opposed in mating relation by lateral movement with respect to each other, an annular sectional core adapted to be disposed between the mold sections, and core expanding thrust members constructed to be moved in the plane of the core by the clamping action of the mold sections as they are moved into mating position.

15. A vulcanizing apparatus including relatively movable mating mold members, annular mating core members receivable between said mold members, and means having movement transverse to that of the mold members and actuatable by movement of the mold members for separating the core members without changing the diameter of the core.

In testimony whereof, I have signed my name in the presence of two subscribing witnesses.

BURGESS DARROW.

Witnesses:
 C. V. P. NEWBOLD,
 W. K. SPRANSY.